Figure 1:
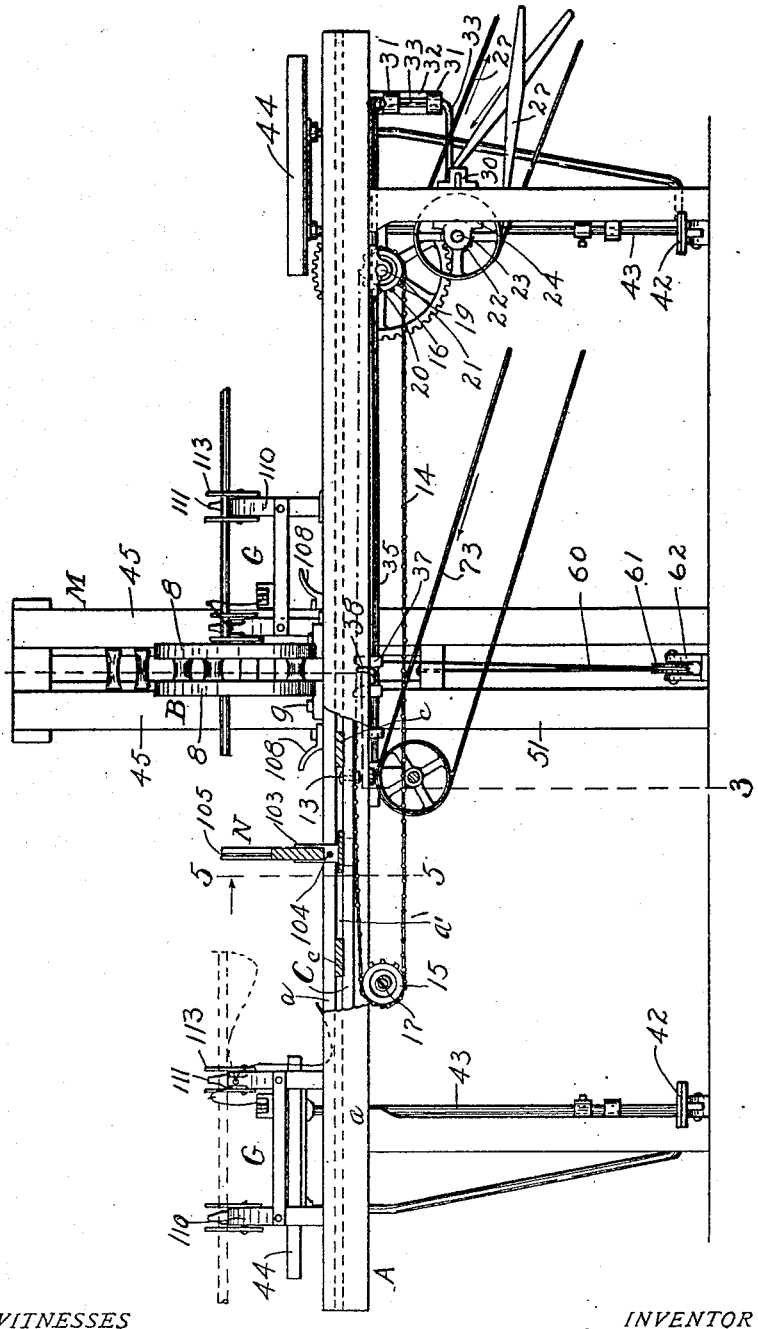

No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 1.

WITNESSES
Carrie R. Ivy
William Whaley

INVENTOR
Louis Stocker
By Cyrus Kehr
Attorney

No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 2.
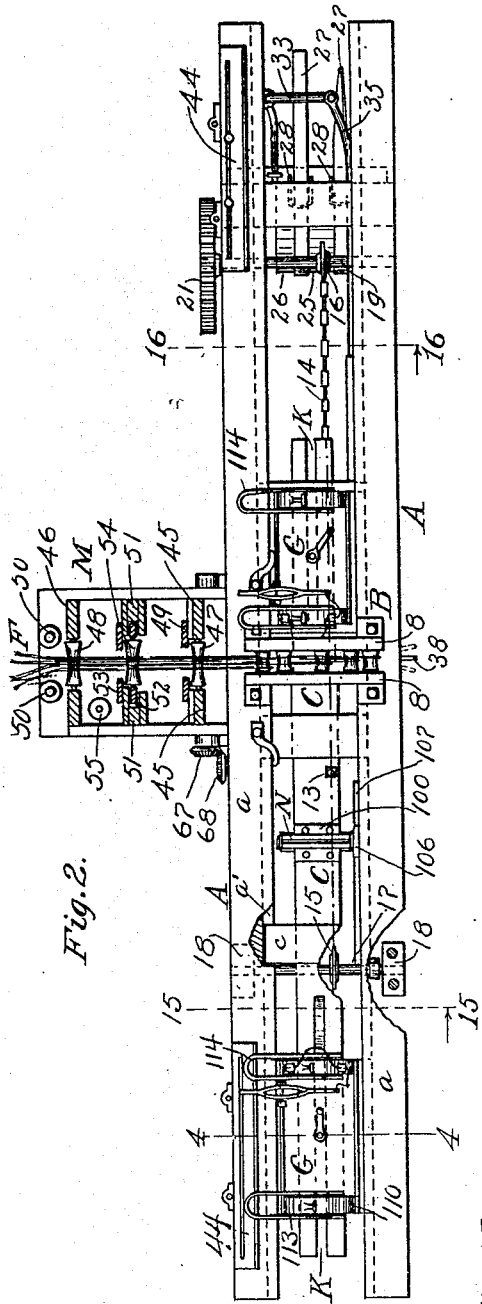
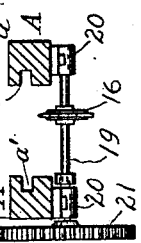
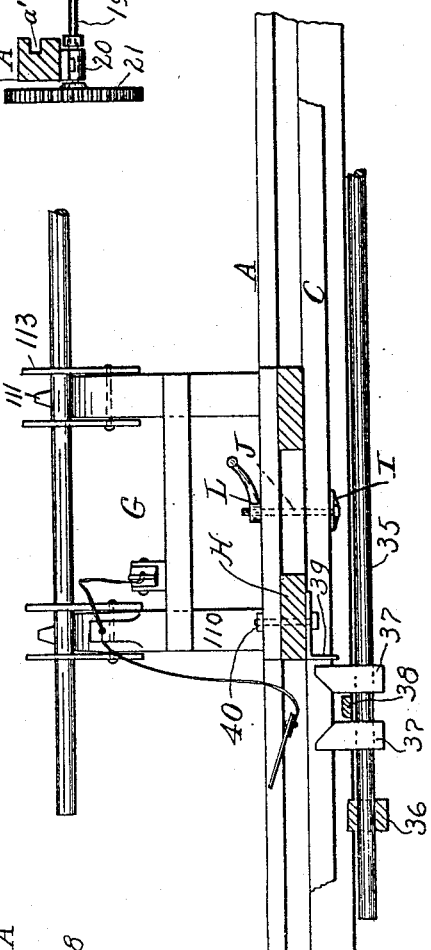
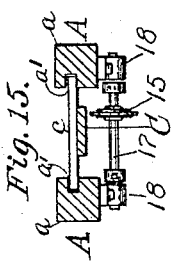
WITNESSES
Carrie R. Ivy
William W. Haley
INVENTOR
Louis Stocker
By Cyrus Kehr
Attorney No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 3.
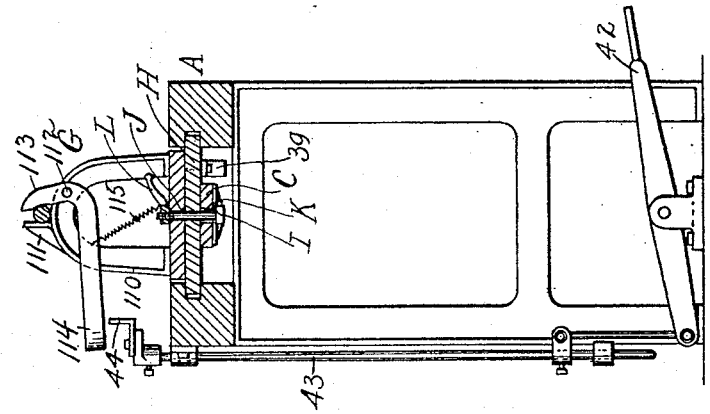
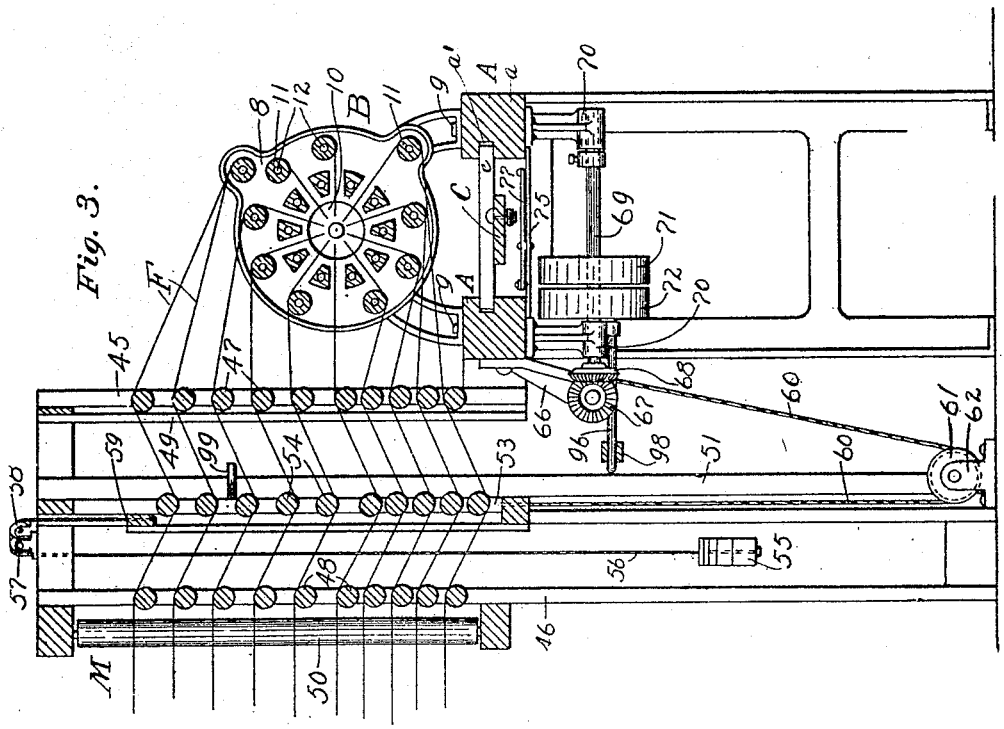
WITNESSES
Carrie R. Ivy
William Whaley
INVENTOR
Louis Stocker
By Cyrus Kehr
Attorney No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 4.
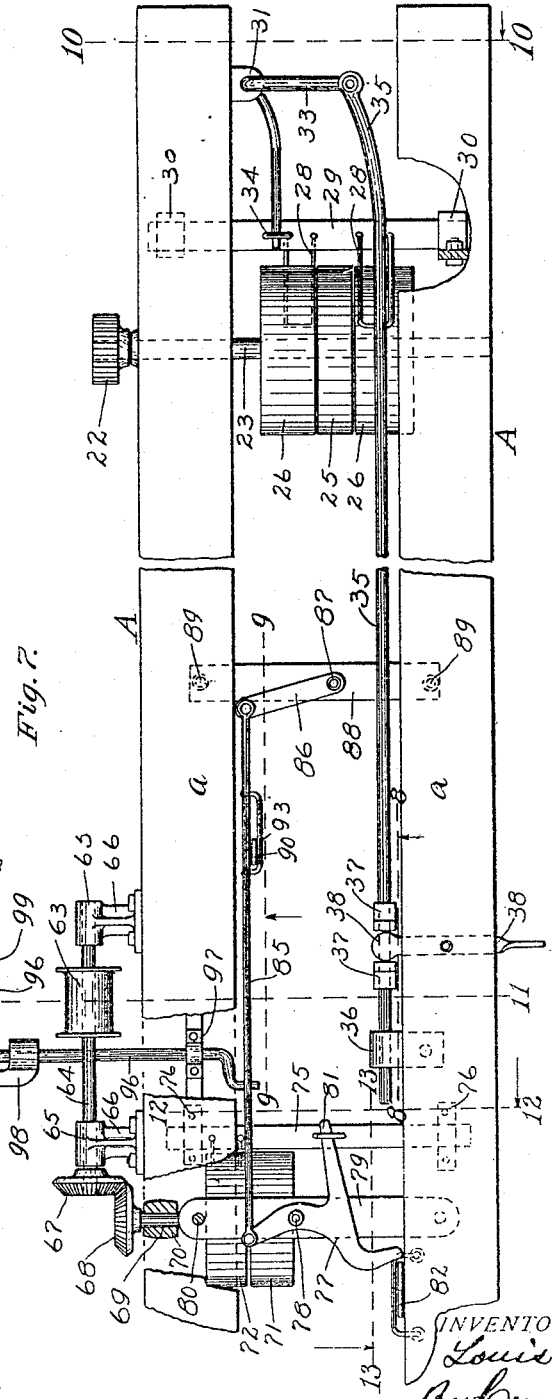
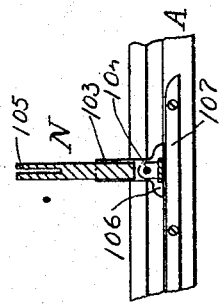
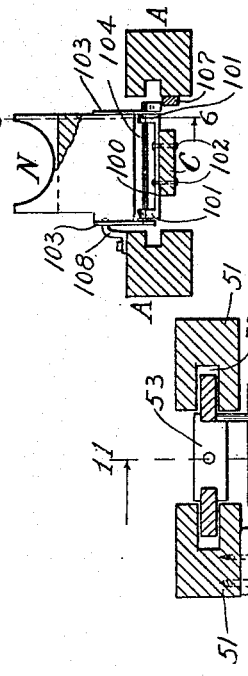
WITNESSES
Carrie R. Ivy
William Whaley
INVENTOR
Louis Stocker
By Cyrus Kehr
Attorney No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 5.
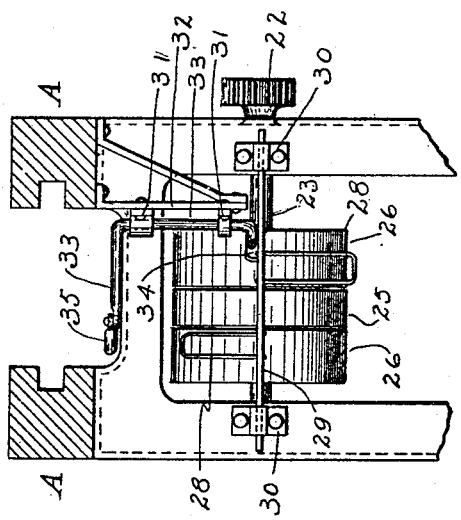
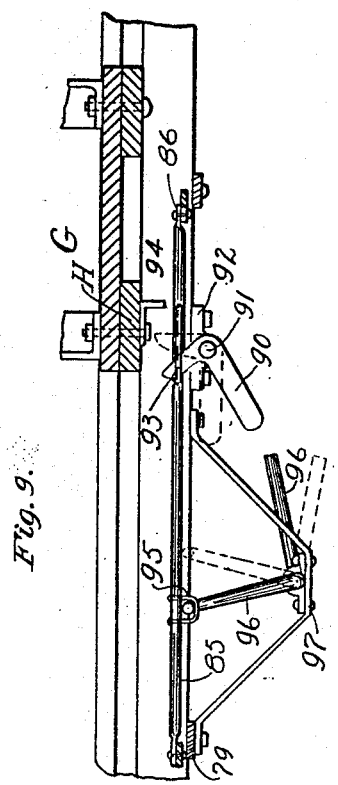
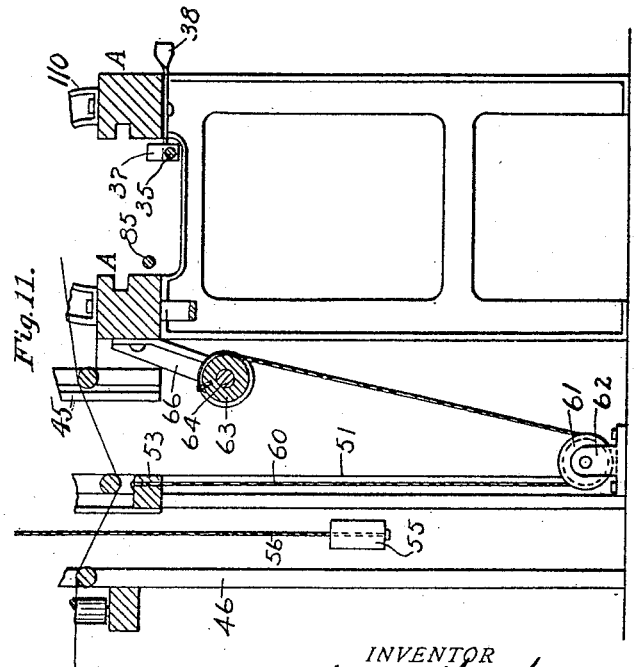
WITNESSES
Carrie R. Ivy
William Whaley
INVENTOR
Louis Stocker
By Cyrus Kehr
Attorney No. 881,740. PATENTED MAR. 10, 1908.
L. STOCKER.
MACHINE FOR MAKING MOPS AND BRUSHES.
APPLICATION FILED JULY 30, 1906.
6 SHEETS—SHEET 6.
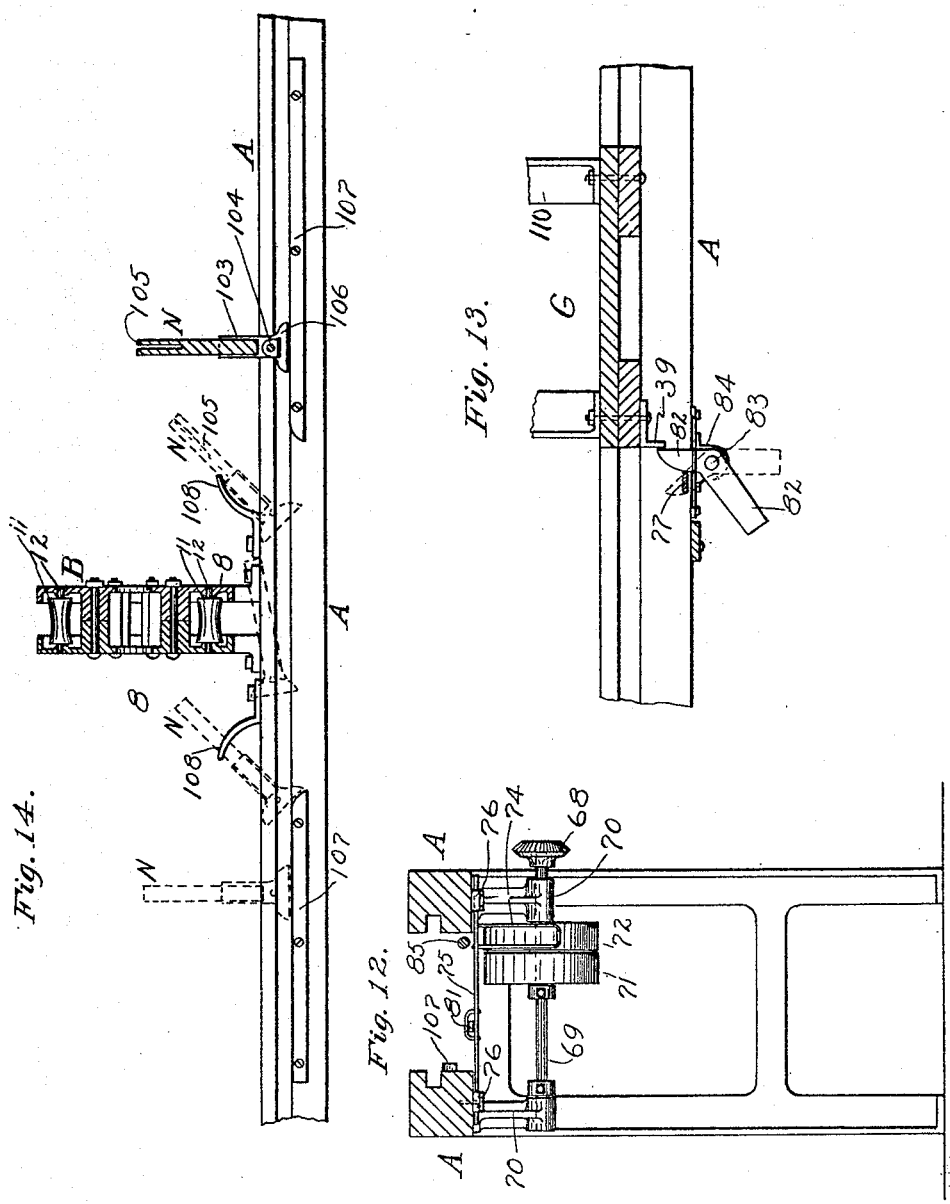
WITNESSES
Carrie R. Ivy
William Whaley
INVENTOR
Louis Stocker
By Cyrus Kehr
Attorney

UNITED STATES PATENT OFFICE.

LOUIS STOCKER, OF KNOXVILLE, TENNESSEE, ASSIGNOR TO MYER BRIDGES COMPANY, OF LOUISVILLE, KENTUCKY, A CORPORATION.

MACHINE FOR MAKING MOPS AND BRUSHES.

No. 881,740.            Specification of Letters Patent.        Patented March 10, 1908.

Application filed July 30, 1906. Serial No. 328,431.

*To all whom it may concern:*

Be it known that I, LOUIS STOCKER, a citizen of the United States, residing at Knoxville, in the county of Knox and State of Tennessee, have invented a new and useful Improvement in Machines for Making Mops and Brushes, of which the following is a specification, reference being had to the accompanying drawing.

My invention relates to machines for making mops and brushes and similar articles, the heads of which are composed of cords, or devices resembling cords; and the invention relates particularly to machines for making such mops or brushes of such cords of indefinite length, a plurality of sections of such cords of approximately even length being applied parallel to each other to a handle.

In the following description, the term, cord or cords, will be applied to cords, strings, yarns, wires, straps and any other similar devices or material suitable for forming the head of a mop or brush.

My improvement is specially applicable to the machine which is the subject-matter of an application, Serial No. 324,860, filed by me July 5, 1906, for Letters-Patent of the United States for an improvement in "Machines for making mops and brushes"; the machine described by my said application being a modification of the machine which is the subject-matter of Letters-Patent of the United States for an improvement in "Machines for making mops and brushes" 842,204, dated January 29, 1907; the object of the improvement described by my said application being to facilitate the placing and engagement of the mop handles in the machine while the head of the mop is being applied to the handles, and the subsequent disengagement of the handles.

The object of the improvement which is made the subject-matter of the present application is to facilitate the delivery or feeding of the cords to the annular cord guide, to facilitate the severing of the cords after they have been secured to the mop handle and to provide for the automatic periodical reciprocation of the handle-supporting carriage.

In the accompanying drawings, Figure 1 is a front elevation of a machine embodying my improvement parts being broken away; Fig. 2 is a sectional plan of the same machine; Fig. 3 is a section on the line 3—3 of Fig. 1; Fig. 4 is a section on the line 4—4 of Fig. 2; Fig. 5 is a section on the line 5—5 of Fig. 1; Fig. 6 is a section on the line 6—6 of Fig. 5; Fig. 7 is a detail plan of a portion of the power-belt-shifting mechanism and the mechanism for controlling the feed of the cords to the annular cord guide; Fig. 8 is a section on the line 8—8 of Fig. 7; Fig. 9 is a section on the line 9—9 of Fig. 7, a portion of the mechanism being omitted; Fig. 10 is a section on the line 10—10 of Fig. 7, looking toward the left; Fig. 11 is a section on the line 11—11 of Fig. 7; Fig. 12 is a detail of the secondary belt-shifting mechanism, the same being a section on the line 12—12 of Fig. 7, looking toward the left; Fig. 13 is a detail of a portion of the secondary belt-shifting mechanism the same being a section on the line 13—13 of Fig. 7, looking toward the front of the machine; Fig. 14 is a rear sectional elevation of the front rail of the frame, illustrating the knife guide. Fig. 15 is a section on the line 15—15 of Fig. 2, looking toward the right; Fig. 16 is a section on the line 16—16 of Fig. 2, looking toward the right.

By way of general description, it may be stated that said machine comprises a stationary base or frame, A, which may be of any desired form and material, and upon said frame are mounted the operative devices.

The functions performed by said operative devices are as follows: Guiding the cords or strands radially to or adjacent to the axial line of the machine, said line being the line with which the axes of the mop or brush handles co-incide while said handles are in the machine; temporarily gripping said handles; and longitudinally shifting said handles, for the drawing of said cords and bringing the latter and the handles into proper position for the tying of the cords to the handles and for the severing of the cords when the binding of the latter to one of the handles has been completed. Usually the handles of such mops or brushes are cylindrical, and the cords or strands are arranged concentrically and symmetrically around said handle. But the handle may be of any other desired cross-sectional form, and the cords or strands may be arranged otherwise than concentrically and symmetrically. If the cords are arranged approximately symmetrically and concentrically to the handle axis, the continuous cords must be so guided as to become arranged approximately evenly in an annular or tubular space around the handle axis. And the handle may be of any desired length.

Upon the middle of the frame or base, A, is placed an annular cord guide, B, concentric with the machine axis; and upon said frame or base is mounted a carriage, C, adapted to reciprocate parallel to the machine axis and extending beyond each side of said annular guide. In the particular form shown in the drawings, the carriage, C, has cross-bars, c, extending into longitudinal grooves or slide-ways, $a^1$, in the opposing faces of the side rails, a, of the frame, A (see Figs. 1, 2, 3, 4, 15, and 16).

The annular guide, B, is composed of two annular sections, 8, secured to the frame, A, by bolts, 9, at a proper distance from each other to admit the cords, F. Each of said sections has a central horizontal aperture, 10, concentric with the machine axis. Between the sections, 8, are a group of guide members, 11, which are distributed or spaced approximately evenly around the machine axis. The function of said members is to guide the cords, F, radially to the center of the guide, and the number of said members is sufficient to afford an approximately even radial distribution of said cords approaching the center of said guide. For the sake of reducing resistance to the induction of said cords, said members, 11, may be in the form of rollers mounted rotatably on shafts, 12, the ends of which are supported by said sections, 8.

For the reciprocation of the carriage, C, mechanism is used as follows: An endless sprocket chain, 14, is attached to the lower face of the carriage at 13 and surrounds a sprocket wheel, 15, toward the left hand end of the frame and the sprocket wheel, 16, toward the right hand end of the carriage. The sprocket wheel, 15, surrounds and is fixed to a transverse horizontal shaft, 17, resting in bearings, 18, applied to the lower face of the frame, A. (See Figs. 2, 15, and 16.) The sprocket wheel, 16, is similarly applied to a similar shaft, 19, resting in similar bearings, 20. To the rear end of the shaft, 19, is applied a spur gear wheel, 21, which meshes with a smaller spur gear wheel, 22, on a similar shaft, 23, located beneath the shaft, 19, and resting in bearings, 24, which bearings are applied to the adjacent upright portion of the frame, A. Upon said shaft, 23, is mounted a fixed band pulley, 25, and at each side of said pulley, 25, is a loose band pulley, 26, approximately twice as wide as the pulley, 25. (See Figs. 2, 7 and 10.) Two driving belts, 27, running in opposite directions are applied to said pulleys and controlled by a belt-shifting device whereby said belts may be simultaneously shifted laterally upon the faces of said pulleys, so that one of said belts may be upon the inner portion of the face of one of the pulleys, 26, while the other of said belts is upon the inner portion of the face of the other pulley, 26, under which condition no power is transmitted; or said belts may be simultaneously shifted so as to place one upon the fixed pulley, 25, while the other rests up he outer portion of the face of one of the loose pulleys, under which condition power is transmitted to the shaft, 23, and from the latter through the spur gears, 22 and 21, to the shaft, 19, and thence through the sprocket wheel, 16, to the sprocket chain and from the latter to the carriage, the direction of movement depending upon which of the two belts, 27, is placed upon the fixed pulley, 25. The details of said belt-shifting mechanism are as follows: A stirrup-form guide, 28, extends around each belt and is secured to a flat horizontal bar, 29, resting slidably in bearings, 30. In upright bearings, 31, placed on a bracket, 32, depending from an adjacent portion of the frame, A, is journaled a bell-crank, 33, one arm of which is coupled to the reciprocatory bar, 29, at 34. The other arm of said bell-crank is coupled to a relatively long reciprocatory bar, 35, located beneath and parallel to the carriage (see Figs. 1, 7, 8, and 10), the left hand end of said shaft resting slidably in a bearing, 36. Adjacent the annular cord guide two standards, 37, rise from the bar or rod, 35. A horizontal hand lever, 38, is pivoted between its ends to the front portion of the frame, A, and has its rear end extending between said standards while its front end projects forward beyond the frame, A, into position to be conveniently reached by the hand of the operator. (See Figs. 7, 8, and 11.) By the shifting of said lever, the bar or rod, 35, may be reciprocated so as to oscillate said bell-crank and cause the latter to shift the reciprocatory bar, 29, and the belt-guides, 28. Thus provision is made for the manual shifting of said belts. For the automatic shifting of said belts, two lugs, 39, are applied to the bottom of the carriage equi-distant from the middle of the carriage. (See Figs. 4 and 8, the lug shown in Fig. 4 being the one at the left and the one shown in Fig. 8 being the one at the right of the middle of the carriage.) The distance between said lugs (or the distance of each lug from the middle of the carriage) is such as that when the carriage travels in one direction, it will engage one of the standards, 37, just before the carriage reaches its limit of travel, whereby the standard, 37, and the shift rod, 35, are moved with the carriage far enough to shift the belts, and so that when the carriage moves in the opposite direction the other lug, 39, acts similarly to cause the shifting of the shift rod, 35, in the opposite direction, whereby the belts are shifted in the opposite direction. This automatic movement of said shift rod, 35, is only far enough to cause the movements of the belts from the fixed pulley to the loose pulleys. And further movement of said rod would move one of the belts from the fixed pulley and bring the other on to said pulley. This is prevented by the proper spacing of said lugs, 39. The idle running of the carriage after the belts have been shifted is prevented by the abutting of one of the handle clamping devices, G, (to be hereinafter described) against the annular cord guide.

In order that the range of travel of the carriage may be varied for the making of mops having heads of different lengths, the lugs, 39, may be located in different positions upon the carriage, and for the same reason, the handle-clamping device is made adjustable upon the carriage as will be hereinafter described. As a matter of convenience, the lugs, 39, are applied to the base, H, of the handle-clamping devices, as shown in Fig. 8, a bolt, 40, extending through the horizontal portion of said lug and through said base.

Upon each end of the carriage is placed a handle-support or handle-clamping mechanism, G. Said mechanism is described and claimed in my said application, Serial No. 324,860, and therefore is not claimed herein. Said mechanism comprises jaws which are located at opposite sides of the machine and which are adapted to engage the mop handles. One jaw of each pair of jaws is fixed while the other is movable. The jaws which are movable are in operative relation with (1) a lever to be moved by the operator, whereby said jaws are moved away from the opposing jaws, and (2) automatic means for moving said jaws toward the opposing jaws when operation through said lever is terminated, so that the engaging and holding of the handle by said jaws is automatic, while the releasing of said jaws for the discharge and reception of handles is non-automatic and performed by the attendant by means of a foot lever, 42, and an upright reciprocatory member, 43, supporting a horizontal bar, 44.

The handle clamping mechanism is mounted upon standards 110 resting on the base plate parallel to each other in a plane transverse to the machine axis, and directly beneath said axis and away from the latter a distance equal to one half of the diameter of one of the handles so that a handle may rest upon said standard and at the same time be axially in line with the machine axis. Rearward of said axis a stationary jaw 111 rises from each standard in proper position to bear against the handle, while pivoted to the front portion of the standard at 112 is the bell crank lever 113 having a horizontal arm 114 (Fig. 4). A coiled spring 115 is joined at its free end to the arm 114 and at its lower end to the base plate so as to normally draw the lever 113 toward the stationary jaw 111. The arm 114 of the bell crank lever is disposed above the bar 44 to be manually actuated thereby.

To provide the adjustability of the handle-supporting mechanism, the base, H, of said mechanism is placed flatwise upon the carriage, a clamping plate, I, is placed beneath the carriage, a clamping bolt, J, extends upward through said clamping plate and a longitudinal slot, K, in the carriage, through said base plate, and is surrounded at its upper end by a nut, L. As will be readily understood, said bolt may be loosened and the base-plate, with the mechanism supported thereby, shifted lengthwise of the carriage, and the bolt again tightened so as to fix said base-plate to the carriage in the new position.

For the purpose of reducing the strain upon the carriage and the handle to which the cords are secured while the carriage is being shifted, I have applied mechanism next thereinafter described to the machine for drawing all the cords toward the annular cord guide a distance approximately equal to the length of each cord section applied for the making of one head, the drawing of such cords being performed while the carriage is stationary. The operation of said drawing mechanism is entirely automatic, and power is applied thereto at proper times from a power belt which is independent of the belts, 27, already described.

The cords, F, come from spools or rolls not shown in the drawings. Directly at the rear of the annular cord guide is a frame-like structure, M. In the front portion of said structure are two upright posts, 45, rising from the rear portion of the frame, A. In the rear portion of said structure are two similar posts, 46, rising from the floor. (See Figs. 2 and 3.) Between the posts, 45, are journaled horizontal guide rollers, 47, of a number corresponding to the number of cords, F. Between the posts, 46, are journaled similar horizontal guide rollers, 48. To the rear of each post, 45, is applied an upright strip, 49, which projects a little way over the rollers, 47, to prevent the cords, F, from slipping laterally off from the rollers, 47. At the rear of and parallel to the posts, 46, are two upright rollers, 50, which serve in the same manner to keep the cords, F, on the guide rolls, 48. Between the posts, 45 and 46, are similar upright posts, 51, located opposite each other and having grooves, 52, in their opposing faces. In said channels rests a frame, 53, which may be raised and lowered as a window sash is raised and lowered in its ways. In said frame are horizontal guide rollers, 54, similar to the guide rollers, 47 and 48. The cords, F, pass over the guide rollers, 47 and 48, and beneath the rollers, 54, so that when said frame is drawn downward, said cords are also drawn downward. When a mop handle is secured in position on the carriage and the ends of the cords are properly attached thereto, and the frame, 53, is then drawn downward, the cords, F, cannot move from the cord guide. Hence they must move from the opposite direction, namely, from the spools or rolls. If the downward movement of said frame is approximately half as far as the length of each cord section in a finished mop, sufficient cord length is drawn from the spools or rolls into the frame, M, to make the next mop head without turning the spools or rolls and without overcoming the resistance to the movement of the various cords through the various guides intervening between the spools and said frame, M. Hence when the carriage is again moved for shifting the mop handle and drawing the cords through the cord guide for the next head, the power required for drawing said cords through said guide is much reduced. Furthermore by this method, the power required for such drawing of the cords for the mop handle is made substantially uniform for the successive operations.

It will be observed that if the frame, 53, is left free to slide downward and thus bear upon the cords, F, said cords will always be under a tension, even when said frame is not being positively drawn downward. To vary said tension, a suitable counterbalance may be applied to said frame. In the drawings, 55 is a weight suspended from a cord, 56, which extends over fixed grooved pulleys, 57 and 58, and extends thence downward to the upper portion of the frame, 53, and is attached to said frame at 59. The weight, 55, may be increased or decreased in any desired manner. The automatic mechanism for actuating said frame, 53, will be next described.

To the lower end of said frame is attached a cord, 60, and said cord extends downward around a stationary grooved pulley, 61, journaled in a base, 62, secured to the floor. Then said cord extends upward to a small drum, 63, and is attached to the latter so that said cord may be wound upon the drum when the latter is rotated. Said drum is mounted upon a shaft, 64, resting in bearings, 65, which bearings are in brackets, 66, extending rearward from the frame, A. On the left hand end of said shaft, 64, is a miter gear wheel, 67, meshing with a similar miter gear wheel, 68, mounted on a horizontal shaft, 69, journaled in brackets, 70, extending downward from the frame, A (see Figs. 3, 7 and 11). Upon said shaft, 69, is a loose band pulley, 71, and a fixed band pulley, 72. To said pulleys is applied a band, 73, extending to a pulley on a countershaft, not shown (Fig. 1). The movement of said band or belt, 73, when it is on the fixed pulley, 72, causes the rotation of the drum, 63, and the winding of the cord, 60, thereon, so that the latter will draw the frame, 53, downward. Said supplemental belt is shifted by a mechanism which may be termed the supplemental belt shifting mechanism of the machine. This mechanism will be next described. A yoke or stirrup, 74, (Fig. 12) surrounds said belt adjacent said pulleys, 71 and 72, and is rigidly supported upon a reciprocatory bar, 75, which bar is transverse to the frame, A, and rests slidably in bearings, 76. Above said bar, in a horizontal plane is a bell-crank, 77, which bell-crank is pivoted at 78 to a transverse bar, 79, the ends of which bar are secured to the frame, A, by means of bolts, 80. Said bell-crank has three arms. The first of said arms is coupled to the bar, 75, at 81. The second arm of said bell-crank extends just below the path of the left hand lug, 39, (Figs. 4 and 13), so that when the carriage is reciprocated, the lug, 39, will pass directly above said arm and almost touch the latter. To effect engagement between said lug, and said arm when the carriage moves in one direction, while such engagement is not made during the movement of the carriage in the opposite direction, a transmitting member, 82, is placed immediately at the left of said arm (see Figs. 7 and 13—Fig. 13 is reversed, the view being from the rear) and pivoted at 83 to a bracket, 84, extending downward from the frame, A. Said transmitting member is V-shape, one arm extending upward a little above the said arm of the bell-crank, while the other arm of said member extends to the right and by its weight tends to tilt said member so that the upper arm is normally pressed toward the arm of the bell-crank, 77. When said lug, 39, moves toward the right, it presses the upper arm of said transmitting member against the arm of the bell-crank, so that said member will transmit motion from said lug to said bell-crank. The further movement of the lug, 39, will move the arm of the bell-crank and the upper end of said shifting member until the latter descends far enough to allow the lug, 39, to pass over it, such movement of the second arm of the bell-crank causing a rearward movement of the first arm and the bar, 75, the stirrup, 74, and the belt, 73, from the loose pulley, 71, to the fixed pulley, 72. The instant the lug, 39, thus passes, the movement of the bell-crank ceases. Before the return of the lug, 39, the bell-crank is shifted by other portions of the mechanism to be hereinafter described, and the said arm of the bell-crank is then returned to its original position, carrying the upper end of the transmitting member, 82, to the left so that the latter will again project into the path of the lug, 39. But, on returning, the lug, 39, will bear against said transmitting member and tilt it away from said arm of the bell-crank and pass over said member.

The above described shifting of the bell-crank is effected by means of the lug, 39, when the carriage approaches its right hand limit of movement. Provision is also made for actuating the bell-crank, 77, in the same direction when the carriage is approaching its left hand limit of travel, so that said supplemental belt is automatically shifted from the loose pulley to the fixed pulley each time the carriage approaches its limit of movement, whether to the right or to the left. Such movement of said bell-crank upon the approach of the carriage to its left hand limit of movement is accomplished by mechanism as follows: To the third arm of the bell-crank, 77, is coupled one end of a reciprocatory rod, 85, the other end of said rod being coupled to one end of a link, 86, the other end of said link being pivoted at 87 flatwise upon a horizontal bridge bar, 88, extending transversely across the frame, A, and secured to the latter by means of bolts, 89, so that in its reciprocation, said rod, 85, is carried by the third arm of said bell-crank and said link, 86. Adjacent the right hand portion of said rod, 85, is a transmitting member, 90, similar to the transmitting member, 82, said member, 90, being pivoted at 91 to a bracket, 92, depending from the frame, A. The upper arm of said transmitting member extends through a horizontal, lateral stirrup, 93, on the rod, 85 (Figs. 7 and 9), while the lower arm of said transmitting member, 90, extends toward the left and tends to tilt the upper arm toward the left. The location of the stirrup, 93, upon said rod, 85, is such as that the transmitting member will normally rest against said stirrup when the upper arm of said member is in approximately the upright position, at which time, of course, said arm extends to its highest limit. Toward the right, said stirrup is elongated so that said member may be tilted toward the right without being stopped by the stirrup.

Applied to the lower face of the rear portion of the base plate, H, of the right hand handle-clamping mechanism is a lug, 94, said lug being in proper position to engage the upper end of said shifting member, 90, when the carriage is near the left hand limit of its range of travel. In moving toward the left, said lug bears against said transmitting member and through the latter shifts said rod, 85, to the left until the upper end of said transmitting member has moved so low as to allow said lug to pass over it, such movement of said rod moving the third arm of said bell-crank rearward and causing the partial rotation of said bell-crank and the movement of the first arm of said bell-crank and of said reciprocatory bar, 75, toward the rear of the machine, whereby the secondary belt, 73, is shifted from the loose pulley, 71, to the fixed pulley, 72, whereby the drum, 63, is set into action. For the upward movement of the frame, 53, it is only necessary to shift the secondary belt, 73, to the loose pulley, 71. Then the strain on the cords, F, by the pulling of the mop handle when the carriage is shifted draws said cords, F, and said frame upward, the cord, 60, the drum, 63, and the shafts and gearing and other connections leading to and including the fixed pulley, 72, being operated in reverse direction. The mechanism for the shifting of the belt, 73, to said loose pulley, 71, is as follows: To the lower face of the rod, 85, already described, is applied a stirrup, 95, to which stirrup is coupled one arm of a bell-crank, 96, the shaft of said bell-crank being journaled at its front portion in a hanger, 97, secured to the frame, A, and at its rear portion in a bracket, 98, applied to one of the posts, 51, so that said bell-crank may oscillate on an axis which is horizontal and transverse to the length of the machine. Rearward of said bracket, 98, said bell-crank has its second arm, and said arm is horizontal and extends into the path of a stud, 99, extending forward from the upper portion of the frame, 53. When said frame, 53, is at its lower limit, said stud bears upon said arm and presses it downward until said bell-crank has been turned sufficiently to cause the upright arm of said crank to shift the rod, 85, toward the right and draw the adjacent or third arm of the bell-crank, 77, to the right, whereby the first arm of said bell-crank and the bar, 75, and the stirrup, 74, and the belt, 73, are shifted forward, the belt going upon the loose pulley. Thus the drum, 73, and the mechanism in operative relation therewith are freed and the frame, 53, may be lifted by the movement of the mop handle to which the cords, F, are tied.

For illustrations of the cutter guide, reference is made to Figs. 1, 2, 5, 6, and 14. N is such guide. It is mounted upon the middle of the carriage so as to stand (when in the operative position) in a plane which is upright and transverse to the machine axis. The two handle-supporting mechanisms, G, are equi-distant from said guide, and the handles are clamped by said mechanisms far enough from said guide so that when the mop cords are cut at the guide, the mop head will have the desired length.

A plate, 100, having upturned ears, 101, is placed transversely upon the carriage at the middle of the latter and secured to said carriage by bolts or rivets, 102. At each side of the guide is a plate, 103, overlapping the adjacent ear, 101, and a shaft, 104, extends horizontally through said ears and plates. Thus said guide is so hinged as that it may be inclined toward either end of the carriage into nearly the horizontal position. The upper end of said guide is cut out in semi-circular form around the machine axis and around the lower portion of the space to be occupied by the group of cords, F. Parallel to the plane of said guide, a slot, 105, is formed into the upper portion of said guide. The function of said slot is to receive and guide the blade of any form of cutting device used for severing the cords, F, when the operation has proceeded far enough for the cutting of the cords to form a mop head. Since the middle of the carriage must pass beneath the annular cord guide, and the cutter guide is higher than the space between the carriage and the lower portion of the cord guide, as often as the carriage is shifted, said cutter guide must be turned upon its hinge far enough to permit it to pass beneath the cord guide, and after it has been so turned it must again be brought into the upright position. Such movements are accomplished automatically. For this purpose, a foot, 106, resembling a cross-head is applied to the forward plate, 103, of the cutter guide, below the hinge of said plate; and at each side of the cord guide a cam rail, 107, is applied to the inner face of the front rail directly beneath said foot, in proper position to bear against said foot when said cutter guide is above said rail. The ends of said rails nearest the cord guide have upward directed cam faces. The operation is as follows: Looking at Fig. 14, if the cutter guide, N, is carried toward the annular cord guide, the foot, 106, will pass out of engagement with the cam rail and leave the guide, N, free to turn upon its hinge. In such condition, the guide, N, might be left until its upper portion comes into engagement with the annular cord guide and thus caused to turn upon its axis and pass beneath said cord guide. But to avoid accidental tilting of the guide, N, toward and bringing its upper end into engagement with the annular cord guide, a finger, 108, is placed upon the frame, A, at either the front or the rear side of said frame (in Fig. 5 it is shown at the rear and in Fig. 14 at the front) in proper position to engage said guide, N, above its hinge, as soon as the latter is freed from said cam rail, and promptly turn said guide, N, away from the annular cord guide. A similar finger, 108, is placed upon the frame, A, at the opposite side of the annular cord guide, and when the carriage moves in the reverse direction, said second finger similarly turns said guide, N, in the opposite direction, as soon as said guide is freed from the other cam rail.

When the tilted guide, N, approaches one of the cam rails, the then lower end of the foot, 106, bears against the end of the cam rail and causes the turning of the guide upon its axis into the upright position (see the dotted representation of the guide in the inclined position in the left hand portion of Fig. 14).

The general operation of this machine is similar to that disclosed in Patent No. 842,204 to Cyrus Kehr, dated January 29, 1907 in that one of the handles is clamped in the supporting mechanism and the ends of the cords attached thereto when the carriage is moved away from the guides into the position shown at the left of Fig. 1. This draws the strands to the left of the head and also inserts the handle carried by the right carriage into the body of strands. The handle on the right carriage is then secured to the strands and these strands cut intermediate of the two handles leaving a completed mop upon the left handle which is released from its carriage by the treadle for that purpose. The motion of the carriage is then from left to right with a new handle inserted in the left carriage. This draws the right handle through the cord guides and carries the strands or cords to the right of the head and during such movement the cutter guide is automatically folded downward to pass beneath said head and rises at the opposite side thereof into position. This movement inserts the handle upon the left carriage into the body of strands as before described and the operation is continued alternately at opposite sides of the head, the reversal of the driving mechanism being automatically effected as described.

I claim as my invention:

1. In a machine for making mops and brushes, the combination of a frame, a handle-supporting mechanism, and a cord guide, reversible power mechanism for relatively reciprocating said handle-supporting mechanism and said cord guide, mechanism for disengaging said power mechanism, and mechanism for engaging said power mechanism, substantially as described.

2. In a machine for making mops and brushes, the combination of a frame, a reciprocatory carriage, handle-supporting mechanism upon said carriage, reversible power mechanism for driving said carriage, mechanism for disengaging said power mechanism when the carriage reaches each limit of travel, and mechanism for engaging said power mechanism, substantially as described.

3. In a machine for making mops and brushes, the combination of a frame, a reciprocatory carriage, handle-supporting mechanism upon said carriage, a fixed pulley and loose pulleys, oppositely moving belts, automatic mechanism for shifting said belts to the loose pulleys when said carriage reaches either limit of travel, and mechanism for shifting either of said belts to the fixed pulley, substantially as described.

4. In a machine for making mops and brushes, mechanism for holding cords of indefinite length at or near the ends which are adjacent the machine, and means for drawing limited lengths of said cords toward the machine while they are held by said holding mechanism, substantially as described.

5. In a machine for making mops and brushes, mechanism for holding cords of indefinite length at or near the ends which are adjacent the machine, mechanism for drawing limited lengths of said cords toward the machine and keeping said cords under tension, substantially as described.

6. In a machine for making mops and brushes, the combination with a movable handle-support and guides for cords of indefinite length, of mechanism for drawing limited lengths of such cords toward the machine while said handle-supporting mechanism is stationary, substantially as described.

7. In a machine for making mops and brushes, the combination with a movable handle-support and guides for cords of indefinite length, of mechanism moving transversely to said cords for drawing limited lengths of such cords toward the machine while said handle-supporting mechanism is stationary, substantially as described.

8. In a machine for making mops and brushes, the combination with a movable handle-support and guides for cords of indefinite length, of a shiftable member adapted to engage said cords, and automatic mechanism for moving said member for drawing said cords toward the machine, substantially as described.

9. In a machine for making mops and brushes, the combination with a movable handle-support, and guides for cords of indefinite length, of ways transverse to the direction of said cords, and a member slidable on said ways and adapted to engage said cords, substantially as described.

10. In a machine for making mops and brushes, mechanism for holding cords of indefinite length at or near the ends which are adjacent the machine, guides for bringing said cords horizontally toward the machine, a device adapted to rest upon the horizontal portions of said cords, and releasable mechanism for forcing said device transversely to said cords, substantially as described.

11. In a machine for making mops and brushes, the combination of a frame, mechanism for holding cords of indefinite length at or near the ends which are adjacent the machine, reversible power mechanism for reciprocating said holding mechanism, mechanism for drawing limited lengths of said cords toward the machine while said holding mechanism is stationary, and secondary power mechanism for actuating said drawing mechanism while said holding mechanism is stationary, substantially as described.

12. In a machine for making mops and brushes, a carriage, handle-holding mechanism supported by said carriage, mechanism for drawing limited lengths of cords of indefinite length toward the machine while the carriage is stationary, substantially as described.

13. In a machine for making mops and brushes, a carriage, handle-holding mechanism supported by said carriage, mechanism for drawing limited lengths of cords of indefinite length toward the machine while the carriage is stationary and subsequently keeping such limited lengths of said cords under tension, substantially as described.

14. In a machine for making mops and brushes, the combination of a cord guide, handle-holding mechanism, a hinged cutter guide, said cutter guide and said holding mechanism, on the one hand, and said cord guide, on the other hand, being relatively reciprocable, substantially as described.

15. In a machine for making mops and brushes, the combination of a cord guide, handle-holding mechanism, a hinged cutter guide, said cutter guide and said holding mechanism, on the one hand, and said cord guide, on the other hand, being relatively reciprocable, and automatic mechanism for turning said cutter guide upon its hinge, substantially as described.

16. In a machine for making mops and brushes, the combination of a cord guide, handle-holding mechanism, and a hinged cutter guide, a carriage supporting said holding mechanism and said cutter guide, substantially as described.

17. In a machine for making mops and brushes, the combination of a cord guide, handle-holding mechanism, and a hinged cutter guide, a carriage supporting said holding mechanism and said cutter guide, and mechanism for automatically turning said cutter guide upon its hinges, substantially as described.

In testimony whereof I have signed my name, in presence of two witnesses, this 27th day of July, in the year one thousand nine hundred and six.

LOUIS STOCKER.

Witnesses:
CYRUS KEHR,
C. A. MORSE.